United States Patent [19]

Kenney

[11] 3,925,811

[45] Dec. 9, 1975

[54] APPARATUS HAVING DROPOUT DETECTION AND COMPENSATION FOR REPRODUCING A VIDEO SIGNAL RECORDED ON A RECORD

[75] Inventor: George Churchill Kenney, Briarcliff Manor, N.Y.

[73] Assignee: North American Philips Corporation, New York, N.Y.

[22] Filed: Feb. 14, 1974

[21] Appl. No.: 442,354

[30] Foreign Application Priority Data

Aug. 7, 1973 Netherlands ....................... 7310869

[52] U.S. Cl. ............................... 358/8; 178/6.6 DC

[51] Int. Cl.² ........................ H04N 5/76; H04N 9/02

[58] Field of Search ............... 358/4, 8; 178/6.6 DC; 360/38, 25

[56] References Cited

UNITED STATES PATENTS

| | | | |
|---|---|---|---|
| 3,463,874 | 8/1969 | Hodge et al. | 358/8 |
| 3,586,762 | 6/1971 | Hodge et al. | 178/6.6 DC X |
| 3,592,961 | 7/1971 | Grace | 358/8 X |
| 3,663,743 | 5/1972 | Dann | 358/8 X |
| 3,679,814 | 7/1972 | Barclay | 358/8 |
| 3,755,621 | 8/1973 | Dillenburger et al. | 358/8 |

*Primary Examiner*—Robert L. Griffin
*Assistant Examiner*—Mitchell Saffian
*Attorney, Agent, or Firm*—Frank R. Trifari; Henry I. Steckler

[57] ABSTRACT

An apparatus for reproducing a video signal which is recorded on a record carrier, which apparatus includes a dropout detection and compensation device. The carrier which is frequency modulated by the luminance signal is divided by two frequency dividers, the first divider supplying a lower frequency signal whose zero crossings correspond to the zero crossings of the rising edges of the modulated carrier and the second divider supplying a lower frequency signal whose zero crossings correspond to the zero crossings of the falling edges of the modulated carrier. The two lower frequency signals are FM-demodulated and comparison of said demodulated lower frequency signals enables dropout detection. During a dropout compensation is possible by inserting the undisturbed lower frequency signal with the aid of a selection device. A similar detection and substantially the same compensation is also possible for the chrominance information when coded in a specific manner.

6 Claims, 7 Drawing Figures

Figure 1:
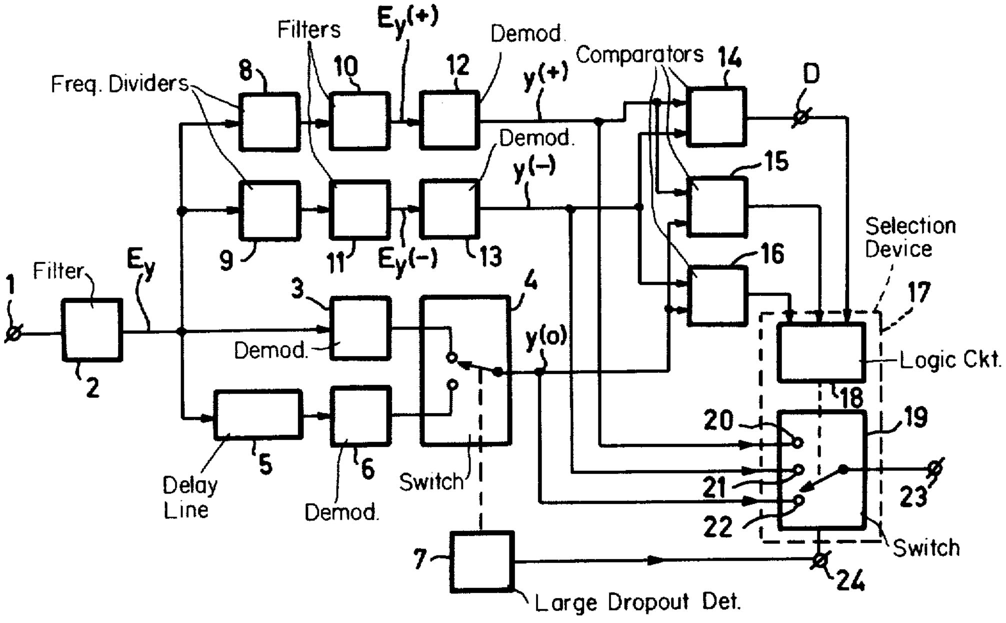

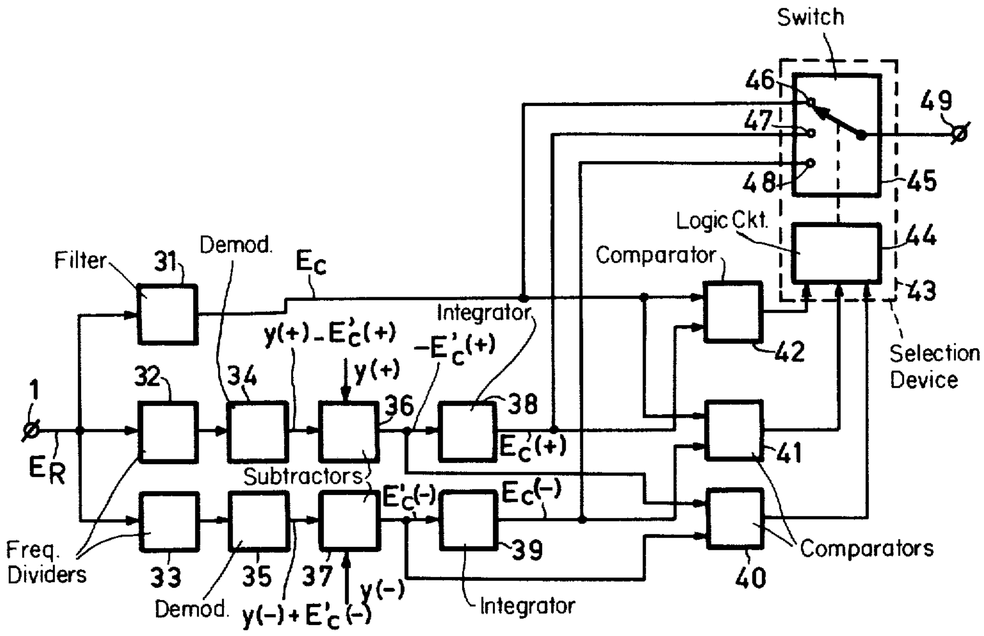
Fig. 5
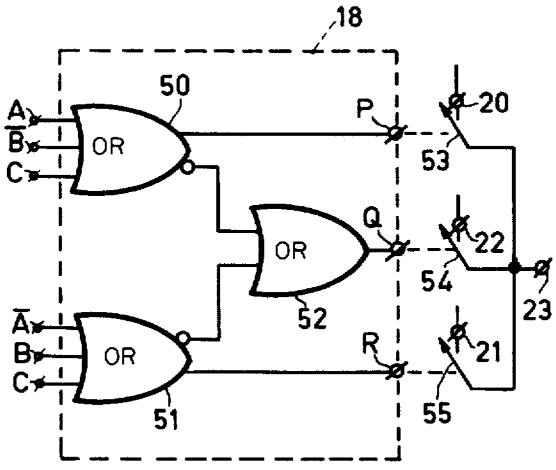
Fig.6a
| A | B | C | P | Q | R |
|---|---|---|---|---|---|
| 1 | 0 | 0 | 1 | 1 | 0 |
| 1 | 1 | 0 | 1 | 0 | 1 |
| 1 | 0 | 1 | 1 | 0 | 1 |
| 1 | 1 | 1 | 1 | 0 | 1 |
| 0 | 0 | 0 | 1 | 0 | 1 |
| 0 | 1 | 0 | 0 | 1 | 1 |
| 0 | 0 | 1 | 1 | 0 | 1 |
| 0 | 1 | 1 | 1 | 0 | 1 |
Fig. 6b

APPARATUS HAVING DROPOUT DETECTION AND COMPENSATION FOR REPRODUCING A VIDEO SIGNAL RECORDED ON A RECORD

The invention relates to an apparatus for reproducing a video signal which is recorded on a record carrier with a carrier which is frequency modulated by the luminance information of the video signal.

The invention in particular relates to apparatus of the type mentioned in the preamble, which are provided with a compensation circuit for the compensation of dropouts in the signal which is read from the record carrier. In this respect dropout is to be understood to mean not only the complete absence of the signal, but also any disturbance of the desired signal. In a known method of dropout compensation use is made of a delay means, for example an ultrasonic delay line, by means of which the signal which is read from the record carrier is delayed by a time equal to one line time of the video signal. In the event of a dropout the delayed signal is reproduced by means of a switch instead of the instantaneous signal supplied by the record carrier, so that during a dropout the information of the preceding line is employed instead of the disturbed information from the one line.

The said switch is controlled by a dropout detector, which serves to detect the occurrence of a dropout and then set the switch to the correct position. As a dropout detector use can be made of a filter device, which detects whether the signal which is read from the record carrier contains components of a frequency outside the frequency band occupied by the desired signal components, specifically the frequency band covered by the modulated carrier wave. The occurrence of such a component is an indication of a disturbance in the signal and thus of a dropout.

It is found that with said known dropout detector it is not possible to detect all dropouts that may occur. Only relatively large interference signals are detected when using the said detection method, whilst relatively small interference signals remain unnoticed. This is evident, because with said detection method dropouts which in the signal which is read from the record carrier cause an interference component of a frequency within the frequency band occupied by the modulated carrier wave are not detected. Such dropouts cause interference components in the demodulated carrier signal which lie entirely within the voltage range covered by the desired signal, i.e. within the peak-to-peak value of said signal. Especially when colour video pictures are reproduced said interference components result in annoying disturbances in the reproduced picture.

It is an object of the invention to provide an apparatus for reproducing video signals, which is provided with a dropout detector by means of which even very small signal dropouts can be detected and can consequently be compensated for. The apparatus according to the invention is characterized in that for the detection of a dropout in the signal which is read from the record carrier, the apparatus includes a first and a second frequency divider stage, which as the case may be via a first filter receive the signal which is read from the record carrier, the first frequency divider supplying a first sub-frequency signal, whose consecutive zero crossings correspond to the zero crossings of the rising edges of the modulated carrier wave and the second frequency divider stage supplying a second sub-frequency signal, whose consecutive zero crossings correspond to the zero crossings of the falling edges of said modulated carrier wave, a first frequency demodulator for demodulating the first sub-frequency signal, a second frequency demodulator for demodulating the second sub-frequency signal and a first comparator circuit for comparing the demodulated first and second sub-frequency signals with each other, which comparator supplies an output signal which is an indication of the occurrence of a dropout.

By "sub-frequency signals" is meant a frequency lower than the recorded signal.

In this respect "zero crossings" is to be understood to mean the instants at which a signal passes a certain reference value, which reference value is generally selected to be symmetrical relative to the peak values of the signal. If the signal is symmetrical relative to the zero level, said reference value will generally be zero volts. However, if the signal contains a d.c. component, the reference value will generally equal said d.c. component. As already stated, it is also possible though, to select a different reference value. In the case of a read square wave signal, the zero crossings directly correspond to the instants at which the signal changes from one possible value to the other possible value and vice versa.

Owing to the steps according to the invention very small signal dropouts can be detected. This is because a shift of a single zero crossing of the modulated carrier wave is signalled irrespective of the magnitude of said shift. The output signal of the first comparator circuit may be used for controlling any known dropout compensation device. This is not only possible for the luminance information but in the event of a colour video signal it is equally applicable to the chrominance information. Depending on the colour system used (NTSC, PAL, SECAM) various compensation circuits are known which must be rendered operative upon the occurrence of a dropout, which consequently can also be performed by the output signal of first comparator circuit.

However, the design of the detection circuit enables the compensation device for the luminance information to be arranged in a special manner with advantage. An embodiment of the apparatus according to the invention, which includes a third frequency demodulator for demodulating the modulated carrier wave which is extracted from the detected video signal, is therefore characterized in that for the compensation of dropouts in the luminance information which is contained in the modulated carrier wave the apparatus is provided with a second comparator circuit for comparing the demodulated carrier wave signal and the demodulated first sub-frequency signal, a third comparator circuit for comparing the demodulated carrier wave signal and the demodulated second sub-frequency signal and a first selection device, which selectively feeds either the demodulated carrier wave signal or one of the demodulated sub-frequency signals to a first output terminal as the luminence information, selection being effected in accordance with the output signals of the three comparator circuits in such a way that the demodulated first sub-frequency signal is fed to said first output terminal if the demodulated second sub-frequency signal is not equal to said demodulated first sub-frequency signal and equal to the demodulated carrier wave signal, that the demodulated second sub-frequency signal is fed to said first output terminal if the demodulated first sub-frequency signal is not equal to said demodulated second sub-frequency signal and equal to the demodulated carrier wave signal, whilst in all other cases the demodulated carrier wave signal is applied to said first output terminal.

Said method of compensation has the advantage that the exactly correct signal is used as a substitute signal, as distinct from the known compensation circuits, where this is the signal of the preceding line of the video picture. Said method of dropout compensation, however, is possible only if of two consecutive edges of the modulated carrier wave only one edge is disturbed, so that the information contained at the location of the other edge may serve as substitute information. However, it is found that with certain record carriers this very type of drop-outs is predominant, so that in those instances the described dropout compensation is very effective.

In order to enable larger dropouts to be compensated as well, any arbitrary known compensation circuit may be added. As a dropout detector for said compensation circuit the first comparator circuit may be employed because this circuit also detects most of the larger dropouts. It is equally possible to use a separate dropout detector, of any arbitrary known design. In order to ensure that in the last case both compensation circuits do not respond to the same dropout, the separate dropout detector can be adapted to supply such a control command to the selection device, upon detection of a dropout that this device assumes a specific position independent of the output signals of the comparator circuits, thus rendering the first compensation circuit inoperative.

As stated hereinbefore, the device according to the invention may be used with special advantage in the reproduction of colour video signals, because in that case small dropouts, which are compensated by the device according to the invention, appear to be most disturbing. As a compensation circuit for the chrominance information any known circuit arrangement may be employed which is activated by the output signal of the first comparator circuit. However, if the colour video signal contains a colour carrier wave modulated by the chrominance information, which is added to the modulated carrier wave in that the zero crossings of the rising and falling edges of the modulated carrier wave are shifted in mutually opposite dependence on that modulated colour carrier wave, which modulated colour carrier wave can be extracted from the signal which is read from the record carrier by means of a second filter, a very special dropout compensation is possible.

An embodiment of the apparatus according to the invention is therefore characterized in that the apparatus includes a third divider stage, to which the signal which is read from the record carrier is applied and which supplies a third sub-frequency signal whose zero crossings correspond to the zero crossings of the rising edges of the detected signal, a fourth divider stage to which the signal which is read from the record carrier is applied and which supplies a fourth sub-frequency signal whose zero crossings correspond to the zero crossings of the falling edges of the detected signal, a fourth frequency demodulator for demodulating the third sub-frequency signal, a fifth frequency demodulator for demodulating the fourth sub-frequency signal, a first subtractor circuit for subtracting the demodulated first sub-frequency signal from the demodulated third sub-frequency signal, a second subtractor circuit for subtracting the demodulated second sub-frequency signal from the demodulated fourth sub-frequency signal, a first integration circuit for integrating the output signal of the first subtractor circuit to a first sub-frequency chrominance signal, a second integration circuit for integrating the output signal of the second subtractor circuit to a second subfrequency chrominance signal, a fourth comparator circuit for comparing the integrated or non-integrated output signals of the first and second subtractor circuits, a fifth comparator circuit for comparing the modulated colour carrier wave and the first sub-frequency chrominance signal, a sixth comparator circuit for comparing the modulated colour carrier wave and the second sub-frequency chrominance signal, and a second selection device, which selectively applies either the modulated colour carrier wave or one of the subfrequency chrominance signals to a second output terminal and which under the influence of the fourth, fifth and sixth comparator circuit performs the selection in such a way that the first sub-frequency chrominance signal is fed to said second output terminal if the fourth comparator circuit detects an inequality and the sixth comparator circuit an equality of their respective input signals, that the second sub-frequency chrominance signal is fed to said second output terminal if the fourth comparator circuit detects an inequality and the fifth comparator circuit an equality of their respective input signals, whilst in all other cases the modulated colour carrier wave is fed to said second output terminal.

This method of compensation has the advantage that the exactly correct information is inserted as substitute information. Similarly to the processing of the luminance information it is of course also possible when processing the chrominance information to combine two compensation systems so as to be able to compensate for every possible type of dropout.

Figure 2:
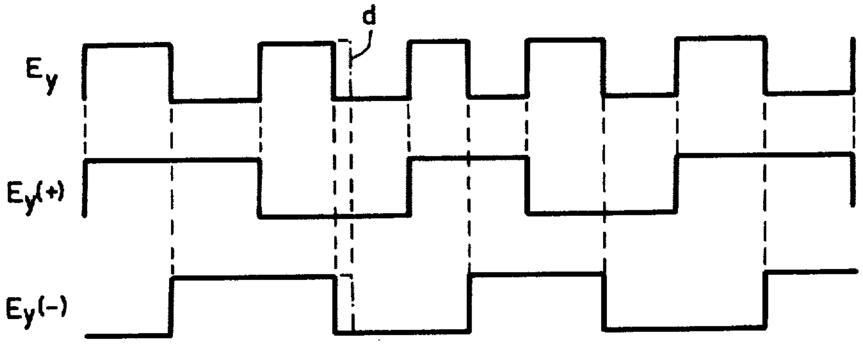
Figure 3:
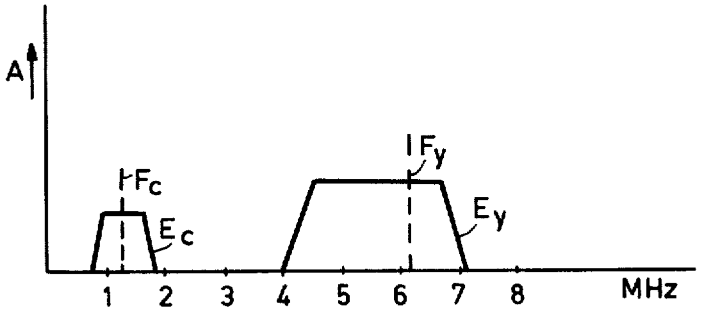
Figure 4:
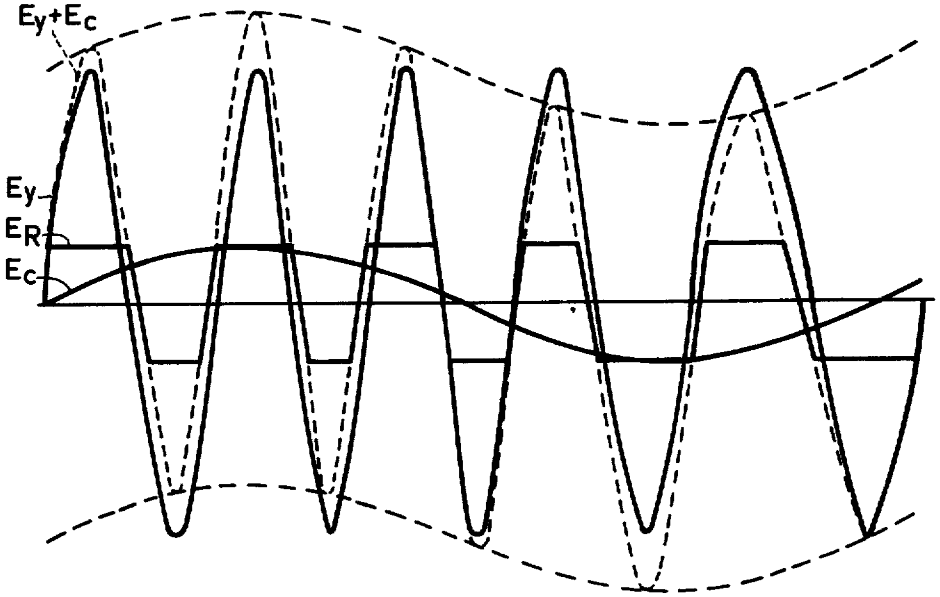

The invention will be described in more detail with reference to the Figures, in which:

FIG. 1 shows a first embodiment of the apparatus according to the invention, and FIG. 2 represents a waveform to clarify the operation of said embodiment, FIG. 3 shows a frequency spectrum of a colour video signal, and FIG. 4 shows how this colour video signal is composed, whilst FIG. 5 shows an embodiment of the apparatus according to the invention which is particularly suitable to compensate for dropouts in the case of such a colour video signal, FIGS. 6*a* and 6*b* finally show by way of example the control logic for the selection device.

The first embodiment of the device according to the invention, shown in FIG. 1, includes an input terminal 1 to which the video signal is supplied, which by means of a read unit, not shown, is read from a record carrier. The modulated carrier, $E_y$, which in a frequency modulated form contains the luminance information, is separated from said video signal with the aid of a filter 2. Said filter 2 may be a band-pass filter, but it may equally have an all-pass characteristic with rejection bands at the location of the undesired signal components such as possible chrominance and sound components. The modulated carrier $E_y$ is demodulated in known manner with the aid of a frequency demodulator 3 and is then normally applied to an output terminal 23, where the luminance information becomes available.

In order to enable a dropout in the signal which has been read from the record carrier to be detected, the modulated carrier $E_y$ is also fed to a first and a second frequency divider stage 8 and 9. The output signal of the frequency divider 8 is a sub-frequency signal, whose zero crossings correspond to the zero crossings of the rising edges of the modulated carrier $E_y$. The frequency divider 9 supplies an output sub-frequency signal, whose zero crossings correspond to the zero crossings of the falling edges of the modulated carrier $E_y$. With the aid of the filters 10 and 11 undesired components are removed from the output signals of the frequency divider stages 8 and 9, after which said filtered signals $E_y$ (+) and $E_y$(−) are demodulated by means of frequency demodulators 12 and 13. The output signals Y(+) and Y(−) of these two frequency demodulators 12 and 13 each include the complete luminance information, i.e. up to a certain maximum frequency limit.

It will be evident that the filter characteristics of the filters 10, 11, and 2 may be selected in different ways. Together, they merely serve to ensure that the demodulators 12 and 13 only receive the desired sub-frequency signals, which should contain luminance information only.

As long the modulated carrier $E_y$ exhibits no dropouts these two demodulated sub-frequency signals Y(+) and Y(−) are identical. However, when a dropout occurs in the modulated carrier $E_y$, resulting in a disturbance of the zero crossing of one of the edges, this will give rise to a difference between the demodulated sub-frequency signals Y(+) and Y(−). This follows directly from FIG. 2, which by way of example shows a rectangular modulated carrier $E_y$ and the squarewave subfrequency signals $E_y$(+) and $E_y$(−) derived therefrom. As long as no dropout occurs the three signals, except for a phase shift, are frequency modulated in an identical manner, though the frequency of the sub-frequency signals $E_y$(+) and $E_y$(−) is always half the frequency of the modulated carrier $E_y$. However, if as a result of a disturbance one of the edges of the modulated carrier $E_y$ is shifted (see dotted line d), this also results in an edge of one of the sub-frequency signals being shifted viz. of the sub-frequency signal $E_y$(−). Since the sub-frequency signal $E_y$(+) is not affected it is evident that there will be a difference between the demodulated subfrequency signals.

This is utilized for detecting such a dropout. For this purpose the two demodulated sub-frequency signals Y(+) and Y(−) are fed to a comparator circuit 14, which supplies a first output signal to an output terminal D when these signals Y(+) and Y(−) are equal, and a second output signal if the two signals differ. Said comparator 14 may for example consist of a difference amplifier and a level detector. The output signal of said comparator 14 at the terminal D may be employed for activating any arbitrary compensation circuit, such as a delay line compensation circuit both for the luminance information and for the chrominance information of the video signal. The main advantage of said detection method is the high sensitivity. A small disturbance of only one edge of the modulated carrier wave suffices to be detected and consequently compensated.

Instead of using an arbitrary known compensation circuit for compensating dropouts in the luminance information it is also possible to use a circuit arrangement as shown in FIG. 1. Said compensation circuit includes a selection device 17 including a switching device 19, which is controlled by a logic circuit 18. The switching device 19 establishes a connection between one of its inputs 20, 21 or 22, to which the demodulated sub-frequency signals Y(+) and Y(−) and the demodulated carrier signal Y(0) are applied respectively, and the output terminal 23. The compensation circuit furthermore includes a comparator 15, which receives the demodulated sub-frequency signal Y(+) and the demodulated carrier signal Y(0), and a comparator 16, which receives the demodulated sub-frequency signal Y(−) and the demodulated carrier signal Y(0). These two comparators 15 and 16 detect whether or not the two signals applied to their inputs are equal in a similar way as the comparator 14. The output signals of the three comparators 14, 15 and 16 are fed to the logic circuit 18 of the selection device 17.

Said logic circuit 18 controls the switching device 19 in such a way that normally, when no dropout occurs, a connection exists between the input 22 and output terminal 23, so that the demodulated carrier signal Y(0) is available at said output terminal 23. As soon as a dropout is detected by the comparator 14 the switching device 19 is set to one of the two other positions. a connection being made either between input 20 and the output terminal 23 or between the input 21 and the output terminal 23. Which of the two positions is assumed depends on the output signals of the comparators 15 and 16. If the comparator 15 detects an equality of its two input signals and comparator 16 detects a difference, the switching device 19 via the logic circuit 18 is set to the position in which a connection is made between input 21 and output terminal 23, so that the demodulated sub-frequency signal Y(−) becomes available at said output terminal 23. If the comparator 15 detects a difference and comparator 16 an equality of the respective input signals, the switching device 19 via the logic circuit 18 is set to the position in which a connection is established between input 20 and output terminal 23, so that the demodulated sub-frequency signal Y(+) becomes available at said output terminal 23 during the dropout. If both comparators 15 and 16 detect a difference between their two input signals, the switching device 19 remains in the position in which a connection is established between the input 22 and output terminal 23, irrespective of the output signal of the comparator 14.

The situation shown in FIG. 2 corresponds to the previously mentioned second possibility. The comparator 14 will detect a dropout, because $E_y$(+) and thus Y(+) are not disturbed, and $E_y$(−) and thus Y(−) are disturbed, so that Y(+) and Y(−) differ. The demodulated signals Y(0) and Y(−) are identical, because they exhibit the same disturbance, so that comparator 16 detects an equality of its input signals. The demodulated signals Y(0) and Y(+), however, differ because Y(+) is not disturbed and Y(0) is disturbed. Comparator 15 consequently detects a difference between its two input signals, so that input 20 of the switching device 19 is connected to the output terminal 23, to which output terminal the undisturbed signal Y(+) is applied during the dropout.

The advantage of this compensation method is that the exactly correct signal is inserted as a substitute signal during the dropout. This is because each of the demodulated sub-frequency signals Y(+) and Y(−) contains the same information at any instant is the demodulated carrier up to certain maximum frequency, except for the occurrence of dropouts, so that in the event of a dropout the undisturbed sub-frequency signal supplies exactly the correct information for compensation, in contradistinction to the known compensation circuits in which there may already be a discrepancy between the delayed compensation signal and the actual signal.

The described compensation circuit compensates for dropouts with a frequency smaller than the fourth part of the carrier frequency $F_v$, whilst video signals and dropouts having a frequency higher than ¼ $F_v$ remain unaffected. This is owing to the fact that as a result of the use of the frequency dividers 8 and 9 the sub-frequency signals only provided a correct reproduction of signal components of a frequency smaller than ¼ $F_v$ in accordance with the Nyquist criterion. As a result, both signal components and signal dropouts with a frequency higher than ¼ $F_v$ will give rise to different demodulated sub-frequency signals Y(+) and Y(−). As said signals Y(+) and Y(−) then both differ from the demodulated carrier signal Y(0), switching device 19 remains in the position in which Y(0) becomes available at the output terminal. The compensation circuit shown therefore in no way reduces the bandwidth of the video signal, whilst the fact that high-frequency dropouts are not compensated for is not annoying, because such dropouts occur only rarely and moreover have not such a disturbing effect.

FIG. 2 shows the situation in which only one edge of the modulated carrier wave $E_v$ is disturbed. Upon the occurrence of a large dropout it may happen that a number of consecutive edges of said modulated carrier wave $E_v$ are disturbed. This presents few problems as regards the detection method, because in general two consecutive edges will never be subjected to the same disturbance and Y(+) and Y(−) will therefore differ, so that said dropout is detected at the output D of the comparator 14. However, it is not possible to compensate for these large dropouts with the aid of the compensation circuit shown, because neither of the demodulated sub-frequency signals Y(+) and Y(−) are undisturbed so that they are not suitable for use as compensation signals. As during the occurrence of such a large dropout both demodulated sub-frequency signals Y(+) and Y(−) differ from the demodulated carrier signal Y(0), the switching device 19 then remains in the position in which the input 22 is connected to the output terminal 23.

In order to enable such large dropouts to be compensated for, the device of FIG. 1 additionally includes a compensation circuit, known per se, comprising a delay means 5, to which the modulated carrier $E_v$ is applied and which introduces a delay of one line time, a demodulator 6 for demodulating the delayed signal, and a switch 4 by means of which at option the nondelayed or the delayed demodulated carrier wave signal is applied to the input 22 of the switching device 19. The switch 4 can be controlled by the output signal of the comparator 14 at the terminal D, because this also responds to substantially all large signal dropouts. However, it is also possible to employ a separate detector 7, of an arbitrary known circuit arrangement, which only detects the large dropouts. In order to prevent that in certain borderline cases both compensation circuits can be activated, the selection device 17 may include an additional control input 24 to which a control signal is fed from the dropout detector 7, so that during a large dropout the input 22 of the switching device 19 remains connected to the output terminal 23, irrespective of the control signal from the logic circuit 18.

As previously stated, it is also possible to employ the dropout detector according to the invention during the reproduction of a colour video signal for the activation of any arbitrary known compensation circuit for the chrominance information. Terminal D in FIG. 1 need then only be connected to a control input of said compensation circuit. However, if a signal coding is employed as described in the previous U.S. Ser. No. 344,863, filed Mar. 26, 1973, it is possible to use a special dropout compensation for the colour information. The signal coding described in said previous Patent Application is particularly intended for recording media on which only two signal levels can be recorded, such as the discshaped record carriers on which the information is recorded in a spiral track in the form of a black-white pattern or a high-low structure and which is read by means of an optical read unit. The coding system described in said previous Application is shown in more detail in FIGS. 3 and 4.

The video signal recorded on the record carrier has a frequency spectrum as shown in FIG. 3 $E_v$ represents the spectrum of the luminance signal, i.e. the frequency modulated carrier. $F_v$ represents the actual carrier wave. $E_c$ denotes the spectrum of the colour information around the colour carrier $F_c$. Said chrominance signal $E_c$ is obtained by extracting the chrominance signal from the original colour video signal and mixing so as to obtain the said lower frequency. The method in which said chrominance signal $E_c$ is added to the luminance signal $E_v$ is represented in FIG. 4. The frequency modulated signal $E_v$ is assumed to have finitely steep edges. The chrominance signal $E_c$, which has a substantially lower amplitude than the luminance signal $E_v$, is added to said luminance signal $E_v$. The sum signal $E_v + E_c$ is limited at two sides, so that, after amplification as the case may be, a substantially rectangular signal $E_R$ is obtained. Said signal $E_R$ is suitable for being recorded on said record carriers. As is evident from the Figure, the zero crossings of the modulated carrier wave $E_v$ are shifted as a result of the chrominance signal $E_c$, i.e. the zero crossings of the rising and falling edges of said luminance signal $E_v$ are shifted oppositely in accordance with said chrominance signal, giving rise to a certain pulse width modulation of the luminance signal $E_v$.

FIG. 5 shows a compensation circuit adapted for the compensation of dropouts in the chrominance information of a video signal composed in this manner. The video signal which is read from the record carrier as a composite signal i.e. the combination of luminance and chrominance information, is fed to a filter 31 via the terminal 1, by means of which filter the chrominance component $E_c$ is extracted. Normally, said chrominance signal $E_c$ is eventually available at a chrominance output terminal 49 and can be restored to the original frequency band of the standard video signal by a mixer, not shown with the aid of a mixing signal. The detected video signal $E_R$ is also applied to frequency dividers 32 and 33. Divider 32 supplies a sub-frequency signal, whose zero crossings correspond to the zero crossings of the rising edges, whilst the divider 33 supplies a sub-frequency signal whose zero crossings correspond to the zero crossings of the falling edges of the detected video signal $E_R$. These two sub-frequency signals are frequency-demodulated with the aid of FM demodulators 34 and 35. It appears that the output signals of said FM demodulators 34 and 35 may be written in terms of $Y(+)-E'_c(+)$ and $Y(-)+E'_c(-)$ respectively, $Y(+)$ and $Y(-)$ being again the demodulated sub-frequency signals of the luminance information and $E_c'(+)$ and $E_c'(-)$ being the derivatives of the chrominance information $E_c(+)$ and $E_c(-)$ contained in the zero crossings of the rising and falling edges respectively of the detected video signal $E_R$. The luminance components $Y(+)$ and $Y(-)$ in these two signals which are supplied by the FM demodulators 34 and 35 are compensated with the aid of subtractor circuits 36 and 37, to which these sub-frequency signals $Y(+)$ and $Y(-)$. which are obtained during dropout detection in the luminance channel of FIG. 1, are applied. To obtain the desired chrominance sub-frequency signals $E_c(+)$ and $E_c(-)$ the output signals of the subtractor circuits 36 and 37 are integrated by integrators 38 and 39, in such a way that these signals have the same sign.

Detection and compensation of a dropout in the chrominance signal can now be effected in an identical manner as for the luminance signal according to FIG. 1. A comparator 40 compares the output signals $E_c'(+)$ and $E_c'(-)$ of the subtractor circuits 36 and 37 and thus detects the occurrence of a dropout. Two further comparators 41 and 42 compare the chrominance signals $E_c(-)$ and $E_c(0)$, and $E_c(+)$ and $E_c(0)$ respectively. These three comparators 40, 41 and 42 in an identical manner as for the compensation circuit for the luminance signal control a selection device 43 with a logic circuit 44 and switching device 45, whilst the signals $E_c(0)$, $E_c(+)$ and $E_c(-)$ are fed to three inputs 46, 47 and 48 of the switching device 45, which selectively feeds one of these signals to a chrominance output terminal 49.

The various elements in the dropout detection and compensation device according to the invention are known and may be realized in different manners. FIG. 6a by way of example shows a method of realizing the logic circuits 18 and 44. Referring to the logic circuit 18, it is assumed that the control signal A is supplied by comparator 15, the control signal B by comparator 16 and control signal C by comparator 14. The logic circuit 18 includes a first OR-gate 50 which receives the control signals A, $\bar{B}$ and C, a second OR-gate 51 which receives the control signals $\bar{A}$, B and C and a third OR-gate 52 which receives the inverted output signals of the two OR-gates 50 and 51. The logic circuit 18 supplies three output signals P, Q and R which are produced by the logic gates 50, 52 and 51. These three output signals P, Q and R control three switches 53, 54 and 55, together forming the switching device 19, which switches respectively can connect the inputs 20, 22 and 21 of the switching device to the output terminal 23.

The truth table of the logic circuit of FIG. 6a is shown in FIG. 6b. When it is assumed that the control signals A, B and C are a logic 1 if the relevant comparator detects an equality of its two input signals and furthermore that switches 53, 54 and 55 are closed when the relevant signal P, Q or R is a logic 0, the said truth table clearly shows that the desired behaviour of the switching device is obtained.

What is claimed is:

1. An apparatus for reproducing a video signal which is recorded on a record carrier which contains a carrier which is frequency modulated by the luminance information of the video signal, said apparatus comprising a first filter having input means for receiving said recorded signal and an output, a first and a second frequency divider, each having an input coupled to said first filter output such that each divider provides a signal of lower frequency than said recorded signal, the first frequency divider having output means for supplying a first lower frequency signal whose consecutive zero crossings correspond to the zero crossings of the rising edges of the modulated carrier, the second frequency divider having output means for supplying a second lower frequency signal whose consecutive zero crossings correspond to the zero crossings of the falling edges of said modulated carrier, a first frequency demodulator means coupled to said first divider output means for demodulating the first lower frequency signal, a second frequency demodulator means coupled to said second divider output means for demodulating the second lower frequency signal, and a first comparator means coupled to said demodulator output means for comparing the demodulated first and second lower frequency signals, said comparator means having an output means for supplying an output signal which indicates the occurrence of a signal dropout.

2. An apparatus as claimed in claim 1, further comprising a third frequency demodulator means coupled to said first filter for demodulating the modulated carrier, a second comparator means coupled to said first and third demodulator, for comparing the demodulated carrier signal and the demodulated first lower frequency signal, a third comparator means coupled to said second and third demodulators for comparing the demodulated carrier signal and the demodulated second lower frequency signal, a first selection device means coupled to said demodulators for selectively applying one of the demodulated signals to a first output terminal as luminance information in accordance with the output signals of the three comparators, the demodulated first lower frequency signal is applied to said first output terminal if the demodulated second lower frequency signal is not equal to said demodulated first lower frequency signal and equal to the demodulated carrier signal, the demodulated second lower frequency signal is applied to said first output terminal if the demodulated first lower frequency signal is not equal to said demodulated second lower frequency signal and equal to the demodulated carrier wave signal, whilst in all other cases the demodulated carrier signal is applied to said first output terminal; whereby dropouts are compensated.

3. An apparatus as claimed in claim 2, further comprising means for the compensation for comparatively large dropouts, which compensation circuit comprises a first delay means coupled to said first filter with a delay time of one line time of the video signal, a further demodulator coupled to said delay means, and a first switch having inputs coupled to said further and third demodulators respectively and an output means coupled to said selection device, which upon the occurrence of a large dropout applies to the first output terminal a demodulated carrier signal which is delayed by one line time by the delay means.

4. An apparatus as claimed in claim 3, further comprising a separate dropout detector for controlling said switch and for supplying a control signal to the selection device, whereby during the occurrence of a large dropout said selection device assumes a specific position independently of the output signals of the comparators.

5. An apparatus as claimed in claim 1, for the reproduction of a colour video signal which is recorded on a record carrier and which contains a colour carrier which is modulated by the chrominance information, which colour carrier is added to the modulated carrier in that the zero crossings of the rising and falling edges of the modulated carrier are shifted in mutually opposite dependence on said modulated colour carrier wave, said apparatus further comprising a second filter having an input means for receiving said recorded signal and an output means for providing for said modulated colour carrier, a third divider having an input means for receiving the signal which is read from the record carrier and an output means for supplying a third lower frequency signal whose zero crossings correspond to the zero crossings of the rising edges of the detected signal, a fourth divider having an input means for receiving the signal which is read from the record carrier and an output means for supplying a fourth lower frequency signal whose zero crossings correspond to the zero crossings of the falling edges of the detected signal, a fourth frequency demodulator means coupled to said third divider output for demodulating the third lower frequency signal, a fifth frequency demodulator means coupled to said fourth divider output for demodulating the fourth lower frequency signal, a first subtractor means for subtracting the demodulated first lower frequency signal from the demodulated third lower frequency signal, a second subtractor means for subtracting the demodulated second lower frequency signal from the demodulated fourth lower frequency signal, a first integrator means for integrating the output signal of the first subtractor to obtain a first chrominance signal, a second integrator means for integrating the output signal of the second subtractor to obtain a second chrominance signal, a fourth comparator means for comparing the integrated or non-integrated output signals of the first and second subtractors, a fifth comparator circuit means for comparing the modulated colour carrier and the first chrominance signal, a sixth comparator means for comparing the modulated colour carrier and the second chrominance signal, and a second selection device means for selectively applying either the modulated colour carrier or one of the chrominance signals to a second output terminal, said applying means comprising logic means coupled to the fourth, fifth and sixth comparators for insuring that the first chrominance signal is applied to said second output terminal if the fourth comparator detects an inequality and the sixth comparator an equality of their respective input signals, that the second chrominance signal is applied to said second output terminal if the fourth comparator detects an inequality and the fifth comparator detects an equality of their respective input signals, whilst in all other cases the modulated colour carrier is applied to said second output terminal.

6. An apparatus as claimed in claim 1 further comprising means for the compensation of comparatively large dropouts, which compensation circuit comprises a third demodulator coupled to said first filter, first output terminal, a first delay means coupled to said first filter with a delay time of one line time of the video signal, a further demodulator coupled to said delay means, and a first switch having inputs coupled to said further and third demodulators respectively and an output means coupled to said selection device, which upon the occurrence of a large dropout applies to the first output terminal a demodulated carrier signal which is delayed by one line time by the delay means.

* * * * *